US012706455B2

(12) United States Patent
Wang

(10) Patent No.: US 12,706,455 B2
(45) Date of Patent: Aug. 11, 2026

(54) POWER SUPPLY SYSTEM AND ELECTRONIC DEVICE

(71) Applicant: Suzhou MetaBrain Intelligent Technology Co., Ltd., Suzhou (CN)

(72) Inventor: Lupan Wang, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/469,015

(22) PCT Filed: Sep. 26, 2024

(86) PCT No.: PCT/CN2024/121504

§ 371 (c)(1),
(2) Date: Sep. 25, 2025

(87) PCT Pub. No.: WO2025/112871

PCT Pub. Date: Jun. 5, 2025

(65) Prior Publication Data

US 2026/0112889 A1 Apr. 23, 2026

(30) Foreign Application Priority Data

Nov. 29, 2023 (CN) ........................ 202311611573.3

(51) Int. Cl.
*H02J 1/08* (2026.01)
*H02J 1/082* (2026.01)
(Continued)

(52) U.S. Cl.
CPC .............. *H02J 1/086* (2020.01); *H02J 1/082* (2020.01); *H02J 1/106* (2020.01); *H02J 7/345* (2013.01);
(Continued)

(58) Field of Classification Search
CPC .. H02J 1/082; H02J 1/084; H02J 1/086; H02J 1/106; H02J 7/345; H02J 2207/20; H02J 2207/50
(Continued)

(56) References Cited

U.S. PATENT DOCUMENTS 9,647,657 B1 5/2017 Bryson et al.

FOREIGN PATENT DOCUMENTS

CN 108233524 A 6/2018
CN 109572450 A 4/2019
(Continued)

OTHER PUBLICATIONS

International Search Report of corresponding PCT application (PCT/CN2024/121504) Nov. 19, 2024, 5 pages.
(Continued)

*Primary Examiner* — Hal Kaplan
(74) *Attorney, Agent, or Firm* — Cooper Legal Group, LLC

(57) ABSTRACT

The present application discloses a power supply system and an electronic device. A first power supply unit includes a plurality of voltage converters, each voltage converter being communicated with a corresponding load unit. A second power supply unit includes a plurality of voltage division components, each voltage converter being connected to a corresponding next-level load unit by means of one voltage division component. A monitoring unit is used for acquiring state information of each load unit and transmitting the state information to a control unit. The control unit is separately connected to an electrical double-layer capacitor, the first power supply unit, and the second power supply unit, so as to control, when state information of a target load unit is abnormal, the voltage division component connected to the target load unit to be conducted, and supplement power for
(Continued)

Power supply system
13 Electrical double-layer capacitor
12 Control unit
14 First power supply unit
15 Second power supply unit
11 Monitoring unit
16 Load unit
Load unit
......
Load unit the target load unit by means of the electrical double-layer capacitor.

20 Claims, 3 Drawing Sheets

(51) Int. Cl.
*H02J 1/10* (2026.01)
*H02J 7/34* (2006.01)

(52) U.S. Cl.
CPC ....... *H02J 2207/20* (2020.01); *H02J 2207/50* (2020.01)

(58) Field of Classification Search
USPC ............................................................ 307/23
See application file for complete search history.

(56) References Cited

FOREIGN PATENT DOCUMENTS

| | | | |
|---|---|---|---|
| CN | 110401198 | A | 11/2019 |
| CN | 111176411 | A | 5/2020 |
| CN | 112910081 | A | 6/2021 |
| CN | 115993882 | A | 4/2023 |
| CN | 117318000 | A | 12/2023 |

OTHER PUBLICATIONS

Written Opinion of International Searching Authority of corresponding PCT application (PCT/CN2024/121504) Nov. 19, 2024, 7 pages.
First Office Action of corresponding CN priority application (CN202311611573.3) Jan. 4, 2024, 7 pages.
Notification to Grant Patent Right for Invention of corresponding CN priority application (CN202311611573.3) Jan. 31, 2024, 2 pages.

POWER SUPPLY SYSTEM AND ELECTRONIC DEVICE

CROSS-REFERENCE TO RELATED APPLICATION

This application claims priority to Chinese Patent Application No. 202311611573.3 filed on Nov. 29, 2023 in China National Intellectual Property Administration and entitled "Power Supply System and Electronic Device", which is hereby incorporated by reference in its entirety.

FIELD

The present application relates to the technical field of power supply, and particularly, to a power supply system and an electronic device.

BACKGROUND

In an era of big data, higher demands are placed on reliability and efficiency of devices. A power supply system may supply power to load units on a device. In practical application, corresponding load units may be deployed according to functions required by the device. To ensure stable and reliable power supply to the load units by the power supply system, as well as the safe operation of the power supply system without downtime, backup power solutions such as backup battery units (BBU) are commonly employed for backup power protection. A board-level power supply provides power to the load units by adopting dual power module redundancy. However, the foregoing implementation lacks logical problem analysis and determination. It may not provide an optimal solution in a short time when abnormal power supply of the load units occurs, nor may it fundamentally resolve the abnormal power supply of the load units. Moreover, a one-active-one-standby scheme in the board-level power supply leads to cost waste and may also introduce a current-sharing issue.

For high-speed link load units in the power supply system, such as high-speed network cards, serial connection cards, and fibre channel (FC) cards, the data transmission rate of these cards has increased to 32 G or even 64 G with continuous upgrade of network card performance. High-speed links are highly susceptible to environmental interference or internal performance anomalies during operation, which may result in card dropouts and consequently interrupt service data processing.

SUMMARY

An objective of some embodiments of the present application is to provide a power supply system and an electronic device.

To solve the above technical problems, the embodiments of the present application provides a power supply system, which includes a monitoring unit, a control unit, an electrical double-layer capacitor, a first power supply unit, and a second power supply unit. The first power supply unit includes a plurality of voltage converters, each voltage converter being communicated with a corresponding load unit. The second power supply unit includes a plurality of voltage division components, each voltage converter being connected to a corresponding next-level load unit through one voltage division component.

The monitoring unit is connected to a plurality of load units and is configured to: acquire state information of the plurality of load units and transmit the state information to the control unit.

The control unit is separately connected to the electrical double-layer capacitor, the first power supply unit, and the second power supply unit and is configured to: receive each state information transmitted by the monitoring unit; and in response to determining that state information of a target load unit is abnormal, control a voltage division component connected to the target load unit to be conducted, and supplement power supply for the target load unit using the electrical double-layer capacitor.

In some embodiments, the monitoring unit is configured to: acquire voltage values of the plurality of load units; and transmit the voltage values to the control unit; and the control unit is configured to: receive each voltage value transmitted by the monitoring unit; and in response to determining that a target voltage value corresponding to the target load unit is abnormal, control the voltage division component connected to the target load unit to be conducted, and supplement the power supply for the target load unit using the electrical double-layer capacitor.

In some embodiments, the control unit is configured to:

read theoretical voltage values corresponding to the plurality of load units in a normal power supply state from a memory;

determine whether voltage values corresponding to the plurality of load units match the theoretical voltage values corresponding to the plurality of load units;

in response to determining that a voltage value of the target load unit does not match a theoretical voltage value of the target load unit, control the voltage division component connected to the target load unit to be conducted; and in response to determining that the electrical double-layer capacitor satisfies a discharge condition, supplement the power supply for the target load unit using the electrical double-layer capacitor, and switch the voltage division component connected to the target load unit to an off state.

In some embodiments, the monitoring unit is configured to: in response to determining that the voltage value of the target load unit does not match the theoretical voltage value of the target load unit, transmit a capacitance value of the electrical double-layer capacitor, a power supplementing voltage value of the electrical double-layer capacitor, and a load current value of the target load unit, which are read, to the control unit; and the control unit is configured to: determine power supplement time according to the received capacitance value of the electrical double-layer capacitor, power supplementing voltage value of the electrical double-layer capacitor, and load current value of the target load unit;

restore the target load unit in response to determining that the power supplement time is greater than power supply anomaly restoration time, or back up the target load unit in response to determining that the power supplement time is less than or equal to the power supply anomaly restoration time.

In some embodiments, the monitoring unit is configured to: transmit read potential values of pins of the target load unit to the control unit in response to determining that the power supplement time is greater than the power supply anomaly restoration time; and the control unit is configured to: receive the potential values of the pins of the target load unit; read theoretical potential values of the pins of the target load unit in the normal power supply state from the memory; and adjust a target potential value of a target pin to a target theoretical potential value in response to determining that the target potential value of the target pin is inconsistent with the target theoretical potential value of the target pin.

In some embodiments, the control unit is configured to: migrate service data of the target load unit to a corresponding load unit on a peer control device in response to determining that the power supplement time is less than or equal to the power supply anomaly restoration time.

In some embodiments, the control unit is configured to: calculate the power supplement time, the power supplement time being obtained by multiplying the capacitance value of the electrical double-layer capacitor with the power supplementing voltage value of the electrical double-layer capacitor, and dividing a product value by the load current value of the target load unit.

In some embodiments, the power supply system further includes a baseboard management controller; and the monitoring unit is connected to the baseboard management controller and is configured to: in response to determining that the voltage value of the target load unit does not match the theoretical voltage value of the target load unit, transmit alarm information to the baseboard management controller, and trigger the baseboard management controller to record an abnormal log.

In some embodiments, the monitoring unit is configured to: acquire load communication data of the plurality of load units; and transmit the load communication data to the control unit;

the control unit is configured to: receive the load communication data; and in response to determining that target load communication data corresponding to the target load unit is abnormal and the target voltage value is normal, migrate service data of the target load unit to a corresponding load unit on a peer control device; and a corresponding load unit on the peer control device is configured to: receive the service data; and process the service data, mark new service data after processing, and cache marked new service data in a memory.

In some embodiments, the control unit is configured to: send a reset signal to the target load unit to restart the target load unit based on the reset signal;

the monitoring unit is configured to: transmit monitored target load communication data of the target load unit to the control unit;

the control unit is configured to: receive the target load communication data; read the marked new service data from the memory in response to determining that the target load communication data is normal; and send the marked new service data to the target load unit; and the target load unit is configured to: receive the marked new service data, process the marked new service data, and store a processing result in a hard disk.

In some embodiments, the monitoring unit is configured to: acquire the voltage values of the plurality of load units through a plurality of sampling pins, and acquire the load communication data of the plurality of load units through a plurality of serial bus links.

In some embodiments, the monitoring unit is configured to: store the voltage values and the load communication data of the plurality of load units in a nonvolatile memory, and update data recorded in the nonvolatile memory according to the voltage values and the load communication data of the plurality of load units which are read in real time.

In some embodiments, the monitoring unit is configured to: detect an available storage space of the nonvolatile memory, and in response to determining that the available storage space of the nonvolatile internal memory is less than a set threshold, delete the data recorded in the nonvolatile memory according to data storage time.

In some embodiments, each voltage division component includes a switching component and a voltage division resistor; supply voltages of the plurality of voltage converters are divided in sequence according to power supply levels of the load units; and a supply voltage of each voltage converter is equal to a load voltage of the corresponding load unit and higher than a load voltage of the next-level load unit.

In some embodiments, a first voltage converter is communicated with a first load unit corresponding to the first voltage converter and connected to a second load unit through a first switching component and a first voltage division resistor. A supply voltage of the first voltage converter is equal to a load voltage of the first load unit and higher than a load voltage of the second load unit; a resistance value of the first voltage division resistor is set based on the supply voltage of the first voltage converter, and the load voltage and load current of the second load unit; and the first voltage converter is any voltage converter in the plurality of voltage converters.

The embodiments of the present application also provides an electronic device, which includes: one or more processors, and a storage device associated with the one or more processors. The storage device is configured to store computer-readable instructions which, when read and executed by the one or more processors, implement steps of: receiving state information of load units transmitted by a monitoring unit; and in response to determining that state information of a target load unit is abnormal, controlling a voltage division component connected to the target load unit to be conducted, and supplementing the power supply for the target load unit using an electrical double-layer capacitor.

In some embodiments, the processor is configured to: receive voltage values of the load units transmitted by the monitoring unit; and in response to determining that a target voltage value corresponding to the target load unit is abnormal, control the voltage division component connected to the target load unit to be conducted, and supplement the power supply for the target load unit using the electrical double-layer capacitor.

In some embodiments, the processor is configured to: read theoretical voltage values corresponding to the plurality of load units in a normal power supply state from the memory;

determine whether voltage values corresponding to the plurality of load units match the theoretical voltage values corresponding to the plurality of load units;

in response to determining that a voltage value of the target load unit does not match a theoretical voltage value of the target load unit, control the voltage division component connected to the target load unit to be conducted; and in response to determining that the electrical double-layer capacitor satisfies a discharge condition, supplement the power supply for the target load unit using the electrical double-layer capacitor, and switch the voltage division component connected to the target load unit to an OFF state.

In some embodiments, the processor is further configured to: in response to determining that the voltage value of the target load unit does not match the theoretical voltage value of the target load unit, receive a capacitance value of the electrical double-layer capacitor, a power supplementing voltage value of the electrical double-layer capacitor, and a load current voltage of the target load unit; determine power supplement time according to the capacitance value of the electrical double-layer capacitor, the power supplementing voltage value of the electrical double-layer capacitor, and the load current voltage of the target load unit; restore the target load unit in response to determining that the power supplement time is greater than power supply anomaly restoration time; or back up the target load unit in response to determining that the power supplement time is less than or equal to the power supply anomaly restoration time.

In some embodiments, the processor is further configured to: receive load communication data of the plurality of load units transmitted by the monitoring unit; and in response to determining that target load communication data corresponding to the target load unit is abnormal and a target voltage value is normal, migrate service data of the target load unit to a corresponding load unit on a peer control device, whereby the corresponding load unit on the peer control device processes the service data, marks new service data after processing, and caches marked new service data in the memory.

In some embodiments, the processor is further configured to: in response to determining that the service data of the target load unit is migrated to the corresponding load unit on the peer control device, send a reset signal to the target load unit to restart the target load unit based on the reset signal; receive target load communication data of the target load unit transmitted by the monitoring unit; in response to determining that the target load communication data is normal, read the marked new service data from the memory; and send the marked new service data to the target load unit, whereby the target load unit processes the marked new service data and stores a processing result in a hard disk.

From the above technical solutions, the power supply system includes the monitoring unit, the control unit, the electrical double-layer capacitor, the first power supply unit, and the second power supply unit. The first power supply unit includes the plurality of voltage converters, each voltage converter being communicated with the corresponding load unit. The second power supply unit includes the plurality of voltage division components, each voltage converter being connected to the corresponding next-level load unit through one voltage division component. The monitoring unit is connected to the load units and is configured to acquire the state information of the load units and transmit the state information to the control unit. The control unit is separately connected to the electrical double-layer capacitor, the first power supply unit, and the second power supply unit and is configured to receive the state information transmitted by the monitoring unit and in response to determining that the state information of the target load unit is abnormal, control the voltage division component connected to the target load unit to be conducted, and supplement the power supply for the target load unit using the electrical double-layer capacitor.

BRIEF DESCRIPTION OF THE DRAWINGS

In order to describe the embodiments of the present application more clearly, the drawings required to be used in the embodiments will be simply introduced below. It is apparent that the drawings described below are only some embodiments of the present application. Other drawings may further be obtained by those of ordinary skill in the art according to these drawings without creative work.

DETAILED DESCRIPTION

The technical solutions in the embodiments of the present application will be clearly and completely described below with reference to the drawings in the embodiments of the present application. It is apparent that the described embodiments are not all embodiments but only part of the embodiments of the present application. All other embodiments obtained by those of ordinary skill in the art on the basis of the embodiments in the present application without creative work shall fall within the scope of protection of the present application.

The terms "include" and "have", and any variants associated with them in the specification, claims, and the above drawings of the present application are intended to cover non-exclusive inclusions. For example, a process, method, system, product, or device including a series of steps or units is not limited to listed steps or units, but may include steps or unit not listed.

To help a person skilled in the art to better understand the solutions of the present application, the present application is further described in detail below with reference to the drawings and implementations.

Figure 1:
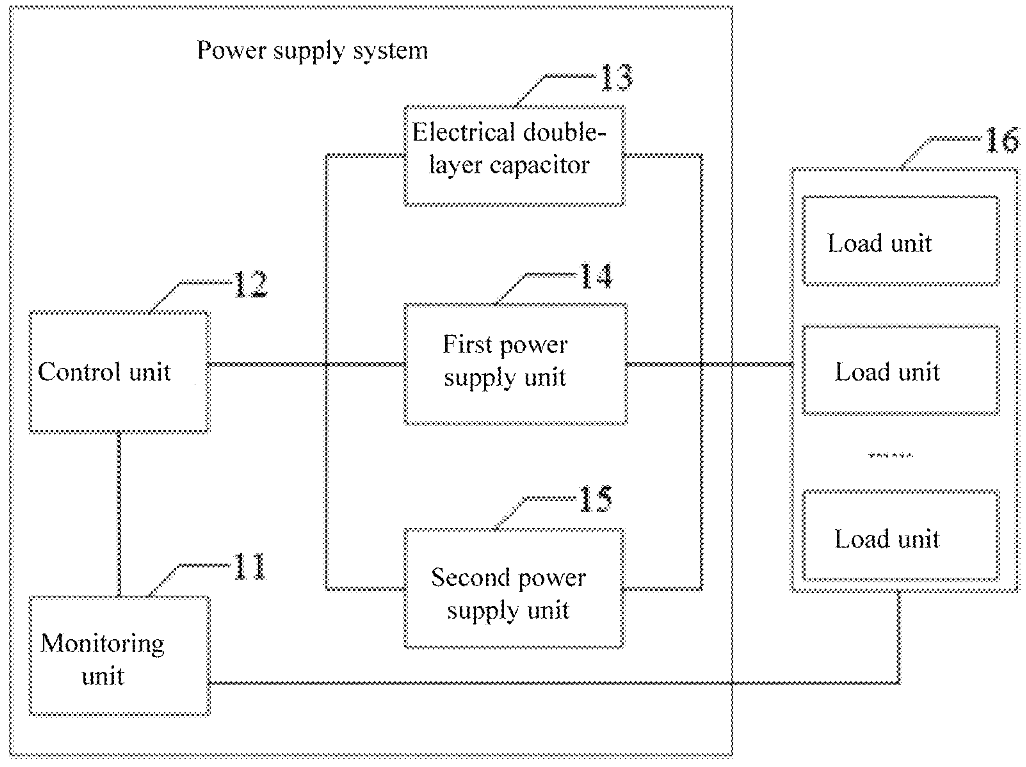
FIG. 1 is a schematic structural diagram of a power supply system provided by some embodiments of the present application.

Next, a power supply system provided by some embodiments of the present application is introduced in detail. The power supply system provided by the embodiments of the present application may be applied in cooling devices, computers, servers, and complete switches. FIG. 1 is a schematic structural diagram of the power supply system provided by the embodiments of the present application. The system includes a monitoring unit 11, a control unit 12, an electrical double-layer capacitor 13, a first power supply unit 14, and a second power supply unit 15.

The first power supply unit 14 includes a plurality of voltage converters, each voltage converter being communicated with a corresponding load unit 16. The second power supply unit 15 includes a plurality of voltage division components, each voltage converter being connected to a corresponding next-level load unit 16 through one voltage division component. The monitoring unit 11 is connected to load units 16. The monitoring unit 11 is configured to acquire state information of the load units 16 and transmit the state information to the control unit 12. The control unit 12 is separately connected to the electrical double-layer capacitor 13, the first power supply unit 14, and the second power supply unit 15. The control unit 12 is configured to:

receive the state information transmitted by the monitoring unit 11, and in response to determining that state information of a target load unit 16 is abnormal, control a voltage division component connected to the target load unit 16 to be conducted, and supplement power supply for the target load unit 16 using the electrical double-layer capacitor 13.

In practical application, the state information of the load units 16 may include voltage values. When power supply anomalies of the load units 16 occur, the voltage values of the load units are changed. Therefore, in the embodiments of the present application, the power supply anomalies may be timely found by monitoring the voltage values of the load units 16.

In the embodiments of the present application, the monitoring unit 11 may acquire the voltage values of the load units 16, and transmit the voltage values to the control unit 12. The control unit 12 may determine whether the voltage values are abnormal after receiving the voltage values transmitted by the monitoring unit 11; and in response to determining that a target voltage value corresponding to the target load unit 16 is abnormal, control the voltage division component connected to the target load unit 16 to be conducted, and supplement the power supply for the target load unit 16 using the electrical double-layer capacitor 13.

In practical application, the voltage values of the load units 16 in a normal power supply state may be recorded in a memory; and for easier distinction, the voltage values in the normal power supply state may be referred to as theoretical voltage values. During implementation, the control unit 12 may read the theoretical voltage values corresponding to the load units 16 in the normal power supply state from the memory, and determine whether the voltage values corresponding to the load units 16 match their theoretical voltage values. Under a condition that the voltage value of the target load unit 16 does not match its theoretical voltage value, power supply of the target load unit 16 is abnormal, and to ensure stability of service on the target load unit 16, the control unit 12 may control the voltage division component connected to the target load unit 16 to be conducted. At this moment, a preceding-level voltage converter of the target load unit 16 is communicated with the target load unit through the voltage division component, to achieve short-time power supply for the target load unit 16.

Further, to ensure that the preceding-level voltage converter is not overloaded due to power supplement, under a condition that the electrical double-layer capacitor 13 satisfies a discharge condition, power may be supplemented for the target load unit 16 using the electrical double-layer capacitor 13, and the voltage division component connected to the target load unit 16 is switched to an OFF state.

The electrical double-layer capacitor 13 is also called supercapacitor, and has characteristics of short charging time and long service life. Startup efficiency and reliability of the electrical double-layer capacitor 13 are higher than those of a traditional accumulator, and it may supplement the power supply for the target load unit 16. The electrical double-layer capacitor 13 may be a 1F supercapacitor. In an initial state, the first power supply unit 14 may charge the electrical double-layer capacitor 13, and the electrical double-layer capacitor 13 enters a standby state after being fully charged. The electrical double-layer capacitor 13 has its corresponding full charge voltage value after being fully charged. In practical application, whether a voltage value of the electrical double-layer capacitor 13 is equal to the full charge voltage value may be determined. Under a condition that the voltage value of the electrical double-layer capacitor 13 is equal to the full charge voltage value, it indicates that the electrical double-layer capacitor 13 satisfies the discharge condition.

In the embodiments of the present application, under a condition that the voltage value of the target load unit 16 does not match its theoretical voltage value, a power supply anomaly of the target load unit 16 occurs, and besides power is supplemented for the target load unit 16, a processing mode for the target load unit 16 may be further determined according to power supplement time supported by the electrical double-layer capacitor 13. There are two processing modes, one is to restore the target load unit 16, and the other is to back up the target load unit 16.

In practical application, the monitoring unit 11 may transmit a capacitance value of the electrical double-layer capacitor 13, a power supplementing voltage value of the electrical double-layer capacitor 13, and a load current value of the target load unit 16, which are read, to the control unit 12, under the condition that the voltage value of the target load unit 16 does not match its theoretical voltage value. The control unit 12 determines the power supplement time according to the received capacitance value of the electrical double-layer capacitor 13, power supplementing voltage value of the electrical double-layer capacitor 13, and load current value of the target load unit 16. If the power supplement time is greater than power supply anomaly restoration time, it indicates that the power of the electrical double-layer capacitor 13 may support the target load unit 16 to complete restoration, and at this moment, the target load unit 16 may be subjected to restoration.

In practical application, the control unit 12 may multiply the capacitance value of the electrical double-layer capacitor 13 with the power supplementing voltage value of the electrical double-layer capacitor 13, and divide a product value by the load current value of the target load unit 16, to obtain the power supplement time.

A calculation formula of the power supplement time is as follows:

$$T = C * U / I,$$

where T denotes the power supplement time, C denotes the capacitance value of the electrical double-layer capacitor, U denotes the power supplementing voltage value of the electrical double-layer capacitor, and I denotes the load current value of the target load unit.

In the embodiments of the present application, restoration time corresponding to different types of power supply anomalies may be recorded in a nonvolatile memory. In response to determining that the target load unit 16 has a power supply anomaly, the monitoring unit 11 may identify a type of the power supply anomaly of the target load unit 16 by acquiring log information of the target load unit 16, and acquire corresponding restoration time from the nonvolatile memory based on the type of the power supply anomaly. For easier distinction, the restoration time may be called power supply anomaly restoration time.

In response to determining that the power supplement time is greater than the power supply anomaly restoration time, the target load unit 16 may be subjected to restoration. To determine a cause of the power supply anomaly, the monitoring unit 11 may read potential values of pins of the target load unit 16, and transmit the potential values of the pins of the target load unit 16 to the control unit 12.

A number of the pins of the target load unit 16 is large, and in practical application, potential values of power related pins may be acquired. The power related pins may include a feedback pin, a compensation pin, a protection pin, a bootstrap pin, etc.

The control unit 12 may, after receiving the potential values of the pins of the target load unit 16 transmitted by the monitoring unit 11, read theoretical potential values of the pins of the target load unit 16 in the normal power supply state from the memory. Under the condition that a target potential value of a target pin is inconsistent with its target theoretical potential value, power supply for the target pin is abnormal, and at this moment, the target potential value of the target pin may be adjusted to the target theoretical potential value.

If the power supplement time is less than or equal to the power supply anomaly restoration time, it indicates that electric quantity of the electrical double-layer capacitor 13 may not support the target load unit 16 to complete restoration, and under this condition, to ensure normal processing of service data, the target load unit 16 may be backed up.

In practical application, one power supply system at least includes two controllers, and the load units 16 with the same functions are deployed on different controllers. By taking two controllers as an example, the two controllers are mutual peer control devices. For example, there are a controller A and a controller B, the controller A is a peer control device of the controller B, and the controller B is a peer control device of the controller A. A backup of the target load unit 16 may be migration of the service data of the target load unit 16 to a corresponding load unit on the peer control device. By migrating the service data of the target load unit 16 to the corresponding load unit on the peer control device, although data processing efficiency may be reduced, uninterrupted processing of the service data may be ensured, and service may still be executed normally.

In the embodiments of the present application, a baseboard management controller may be arranged. The monitoring unit 11 is connected to the baseboard management controller and is configured to: in response to determining that the voltage value of the target load unit 16 does not match its theoretical voltage value, transmit alarm information to the baseboard management controller, and trigger the baseboard management controller to record an abnormal log.

Beside the power supply anomaly, in practical application, the load unit 16 in the normal power supply state may have a high-speed link load communication anomaly. In the embodiments of the present application, the monitoring unit 11 may acquire load communication data of the load units 16, and transmit the load communication data to the control unit 12.

Processing modes for the load units 16 are similar, and for easier description, the target load unit 16 taken as an example is introduced.

In response to determining that the target voltage value of the target load unit 16 is normal, the control unit 12 may, after receiving the load communication data of the load units 16 transmitted by the monitoring unit 11, determine whether load communication data corresponding to the target load unit 16 is abnormal.

Under a condition that the target load communication data corresponding to the target load unit 16 is abnormal and the target voltage value is normal, it indicates that the target load unit 16 currently has a high-speed link load communication anomaly, but has not yet encountered operational stoppages, card dropouts, or data loss. To prevent system downtime caused by operational stoppages, card dropouts, or data loss of the target load unit, the service data on the abnormal target load unit 16 may be backed up in advance.

In practical application, the service data of the target load unit 16 may be migrated to a corresponding load unit on a peer control device. After receiving the service data, the corresponding load unit on the peer control device may process the service data, mark new service data after processing, and cache marked new service data in the memory.

By marking the new service data, convenience is provided for the control unit 12 to distinguish which data is that generated due to service migration. The new service data is cached in the memory and may be conveniently accessed quickly.

When the target load unit 16 has a high-speed link load communication anomaly, processing operation for the service data on the target load unit 16 may be separated from a load link of the target load unit 16, and the service data is allocated to a corresponding load unit on the peer control device to execute. At this moment, the control unit 12 may send a reset signal to the target load unit 16 to restart the target load unit 16 based on the reset signal.

The monitoring unit 11 may monitor the target load communication data of the target load unit 16, and transmit the target load communication data to the control unit 12. The control unit 12 may, after receiving the target load communication data, determine whether the target load communication data has returned to normal. Under the condition that the target load communication data is normal, it indicates that the target load unit 16 may undertake service data processing again, and at this moment, the control unit 12 may read the marked new service data from the memory and send the marked new service data to the target load unit 16. The target load unit 16 may, after receiving the marked new service data, process the marked new service data and store a processing result in a hard disk.

The monitoring unit 11 may be configured to acquire the voltage values and the load communication data of the load units 16. In practical application, the monitoring unit 11 may acquire the voltage values of the load units 16 through a plurality of sampling pins, and acquire the load communication data of the load units 16 through a plurality of serial bus (like inter integrated circuit, I2C) links.

The monitoring unit 11 stores the voltage values and the load communication data of the load units 16 in a nonvolatile memory, and updates data recorded in the nonvolatile memory according to the voltage values and the load communication data of the load units 16 which are read in real time.

In view of a limited storage space of the nonvolatile internal memory, to ensure the availability of the nonvolatile memory, an available storage space of the nonvolatile internal memory may be monitored. The monitoring unit 11 may detect the available storage space of the nonvolatile memory. Under the condition that the available storage space of the nonvolatile internal memory is less than a set threshold, the data recorded in the nonvolatile memory is deleted according to data storage time.

A value of the threshold may be determined based on a total storage space of the nonvolatile memory and a proportion of a reserved emergency space in the total storage space. For example, 80% of the capacity may be configured to store data, 20% of the capacity serves as the emergency space, and generally no data is stored in the emergency space. Assuming the total storage space of the nonvolatile memory is 512 KB, the threshold may be set as 512*20%=102.4 KB. Under a condition that the available storage space of the nonvolatile memory falls below 102.4 KB, data stored for the longest time in the nonvolatile memory may be deleted.

In the embodiments of the present application, by recording the voltage values and the load communication data of the load units in the nonvolatile memory, it allows the controller to easily understand an operating status of the load units. By updating the data recorded in the nonvolatile memory in real time, the latest voltage values and load communication data are ensured to be stored in the nonvolatile memory. The available storage space of the nonvolatile memory is monitored, thereby ensuring that the nonvolatile memory is always in an available state and enhancing data storage reliability.

In the embodiments of the present application, the first power supply unit 14 may adopt the plurality of voltage converters. Since different types of load units 16 require different supply voltages, the supply voltages of the plurality of voltage converters may be set based on power supply requirements of the load units 16.

In the embodiments of the present application, the second power supply unit 15 is arranged to provide downward compatible power supply for the plurality of voltage converters. The second power supply unit 15 may include the plurality of voltage division components.

Each voltage division component may include a switching component and a voltage division resistor. The switching component may be a metal oxide semiconductor (MOS).

In practical application, supply voltages of the plurality of voltage converters may be divided in sequence according to power supply levels of the load units 16, and a supply voltage of each voltage converter is equal to a load voltage of the corresponding load unit 16 and higher than a load voltage of a next-level load unit 16.

For example, the power supply levels may be divided as follows: 5 V, 3.3 V, 2.5 V, 1.8 V, 1.2 V, and below 1 V. Each power supply level may correspond to one or more voltage converters. For easier description, a voltage converter corresponding to the power supply level of below 1 V may be called a current-level first power supply, a voltage converter corresponding to the power supply level of 1.2 V may be called a preceding-level first power supply unit; and a voltage converter corresponding to the power supply level of 1.8 V may be called a preceding-two-level first power supply unit. Following this principle, the voltage converters corresponding to different power supply levels may be subjected to level naming.

A function of the second power supply unit 15 and the electrical double-layer capacitor 13 is to provide downward compatible power supply from a preceding-level first power supply unit of a load unit when the load unit has a power supply anomaly. The electrical double-layer capacitor 13 may equally supplement power for the current load unit with the power supply anomaly.

Downward compatible power supply of each voltage converter in the first power supply unit 14 refers to that when 3.3 V power supply is abnormal, 5 V is for short-time power supply supplement. When 2.5 V power supply is abnormal, 3.3 V is for short-time power supply supplement. Following this principle, when power supply below 1 V is abnormal, 1.2 V is for power supply supplement.

When the control unit 12 monitors that the load unit 16 has a power supply anomaly, the control unit 12 provides a switch-on signal for a MOS connected to a preceding-level voltage converter of the abnormal load unit 16 timely, and at this moment, the preceding-level voltage converter supplies power to the original load unit and supplement the power supply for the abnormal load unit simultaneously, to ensure that the load unit with the power supply anomaly operates normally in a short time, thereby allowing a certain discharge preparation time for the electrical double-layer capacitor. In addition, the monitoring unit 11 may record conditions of this group of load units and provide them to the control unit 12, whereby the control unit 12 determines the power supplement time according to the capacitance value of the electrical double-layer capacitor, the power supplementing voltage value of the electrical double-layer capacitor, and a load current value of the load unit with the power supply anomaly. Measures to be taken are determined based on the length of the power supplement time.

Processing modes for each voltage converter are similar, and by taking any one voltage converter in all the voltage converters as an example, a connection relationship and an operating mode of the voltage converter are introduced. For easier distinction, the voltage converter may be called a first voltage converter. A switching component connected to the first voltage converter is called a first switching component, and a load unit 16 directly connected to the first voltage converter is called a first load unit. A voltage division resistor connected to the first switching component is called a first voltage division resistor, and a load unit 16 connected to the first voltage division resistor is called a second load unit.

In practical application, the first voltage converter is communicated with its corresponding first load unit. The first voltage converter is connected to the second load unit through the first switching component and the first voltage division resistor. A supply voltage of the first voltage converter is equal to a load voltage of the first load unit and higher than a load voltage of the second load unit. A resistance value of the first voltage division resistor is set based on the supply voltage of the first voltage converter, and the load voltage and load current of the second load unit. The first voltage converter is any one voltage converter in the plurality of voltage converters.

The control unit 12 may control the ON or OFF between the voltage converter and the next-level load unit by controlling the ON or OFF of the switching component. There are a plurality of types of switching components, such as a metal oxide semiconductor (MOS) or a transistor. For easier description, subsequently the switching component that is the transistor is taken as an example for introduction.

Figure 2:
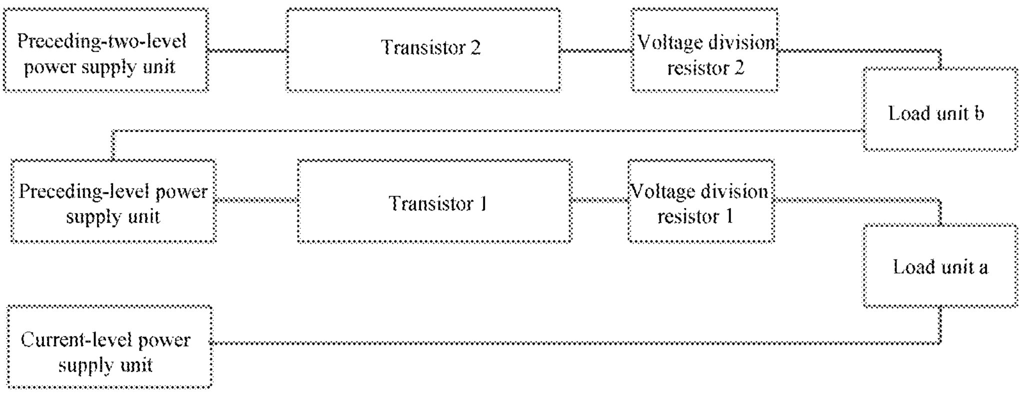
FIG. 2 is a schematic diagram of a connection relationship of a second power supply unit provided by some embodiments of the present application.

FIG. 2 is a schematic diagram of a connection relationship of the second power supply unit provided by some embodiments of the present application. In FIG. 2, two voltage division components are taken as an example, and both respectively include a transistor and a voltage division resistor. Because of a difference in voltage division values required by the two voltage division components, resistance values of the two voltage division resistors in FIG. 2 may vary, and the two voltage division resistors are denoted as a voltage division resistor 1 and a voltage division resistor 2 in FIG. 2. For easier distinction, the transistor connected to the voltage division resistor 1 may be called a transistor 1, and the transistor connected to the voltage division resistor 2 may be called a transistor 2.

The current-level first power supply unit is directly connected to a load unit a in FIG. 2. The preceding-level first power supply unit is connected to a load unit b. To achieve downward compatible power supply, the preceding-level first power supply unit is connected to the load unit a through the transistor 1 and the voltage division resistor 1, and the preceding-two-level first power supply unit is connected to the load unit b through the transistor 2 and the voltage division resistor 2. By taking FIG. 2 as an example, for the preceding-level first power supply unit, the load unit a is equivalent to a current-level load unit, and the load unit b is equivalent to a next-level load unit.

In an initial state, the transistors may all be in an OFF state. When a certain load unit has a power supply anomaly, the control unit 12 may control the transistor connected to the load unit to be conducted. For example, when the control unit detects that the load unit a has a power supply anomaly, it may control the transistor 1 to be conducted, and at this moment, a link between the preceding-level first power supply unit and the load unit a is in an ON state, and the preceding-level first power supply unit may supplement power for the load unit a.

In combination with the above example, the preceding-level first power supply unit originally needs to supply power to the load unit b, and if the preceding-level first power supply unit supplies power to the load unit a on this basis, a problem that the preceding-level first power supply unit is overloaded may arise. Therefore, in the embodiments of the present application, after the electrical double-layer capacitor 13 finishes discharge preparation and starts to supply power to the load unit a, the control unit may control the transistor 1 to the OFF state; and at this moment, the preceding-level first power supply unit only needs to supply power to the load unit b, to ensure that the preceding-level first power supply unit is not overloaded due to power supplement for the load unit a.

In the embodiments of the present application, the voltage division components are arranged between the voltage converters and the load units, whereby the voltage converters may supply power to the load units connected originally, and may also supplement the power supply for the next-level load units. Therefore, in case of a power supply anomaly in one of the load units, power supplement may be timely performed, and normal processing of service is ensured.

In the embodiments of the present application, a microcontroller unit (MCU) may serve as the monitoring unit 11. The monitoring unit 11 may include two parts, namely, a potential monitoring unit and a communication monitoring unit. The MCU provides the plurality of sampling pins, and may timely read a current voltage value of the load unit 16. The MCU also provides a plurality of I2C pins, and may read current load communication data in real time through the I2C links. The MCU may access and update the currently read data in real time, to continuously update current pin potential values and the load communication data.

The MCU may be a STMicroelectronics module (STM32F446RCT6TR), and this module may provide four I2C interfaces for acquiring the load communication data, whereby the control unit 12 evaluates whether high-speed link load communication is normal, depending on the load communication data. 24 analog-to-digital converter (ADC) pins provided by the MCU are configured to detect potentials, and the MCU provides a 512 KB storage space for data storage.

The control unit 12 may, with a complex programmable logic device (CPLD) as a core, control downward compatible power supply of the voltage converters, and function repair or backup of abnormal load units. The CPLD may be an integrated circuit module (LCMXO3LF-9400C-5BG484C), and this module provides a 1175 logic array block (LAB), supports a large number of logical resources operating simultaneously in parallel, and may efficiently complete compatible power supply control and a state restoration function in an abnormal power supply state.

The first power supply unit 14 is a power supply core of the power supply system, the first power supply unit 14 includes a plurality of direct current to direct current (DCDC) voltage converters, the voltage converters may be high-frequency synchronous buck converters (MPQ8633A), and MPQ8633B may provide 20A current output and 0.6-5.5 V voltage output and cover most of power supply conditions of a current board-level power supply.

From the above technical solution, it may be seen that the power supply system includes the monitoring unit, the control unit, the electrical double-layer capacitor, the first power supply unit, and the second power supply unit. The first power supply unit includes the plurality of voltage converters, each voltage converter being communicated with the corresponding load unit. The second power supply unit includes the plurality of voltage division components, each voltage converter being connected to the corresponding next-level load unit through one voltage division component. The monitoring unit is connected to the load units and is configured to acquire the state information of the load units and transmit the state information to the control unit. The control unit is separately connected to the electrical double-layer capacitor, the first power supply unit, and the second power supply unit and is configured to receive the state information transmitted by the monitoring unit, and in response to determining the state information of the target load unit is abnormal, control the voltage division component connected to the target load unit to be conducted, and supplement power for the target load unit using the electrical double-layer capacitor. The present application has the following beneficial effects: by matching the second power supply unit with the first power supply unit, voltage compatibility may be achieved, whereby the first power supply unit may supply power to the corresponding load unit, and may also provide required voltage to the next-level load unit through the second power supply unit when the next-level load unit has a power supply requirement. The electrical double-layer capacitor may supplement the power supply for a load unit with a power supply anomaly. Even though a certain load unit has a power supply anomaly, short-time redundant power may be supplied to the abnormal load unit through the electric double-layer capacitor in a voltage-compatible manner, thereby preventing system downtime caused by power supply anomalies, ensuring the stability of service data processing, and enhancing the reliability of the power supply system.

Figure 3:
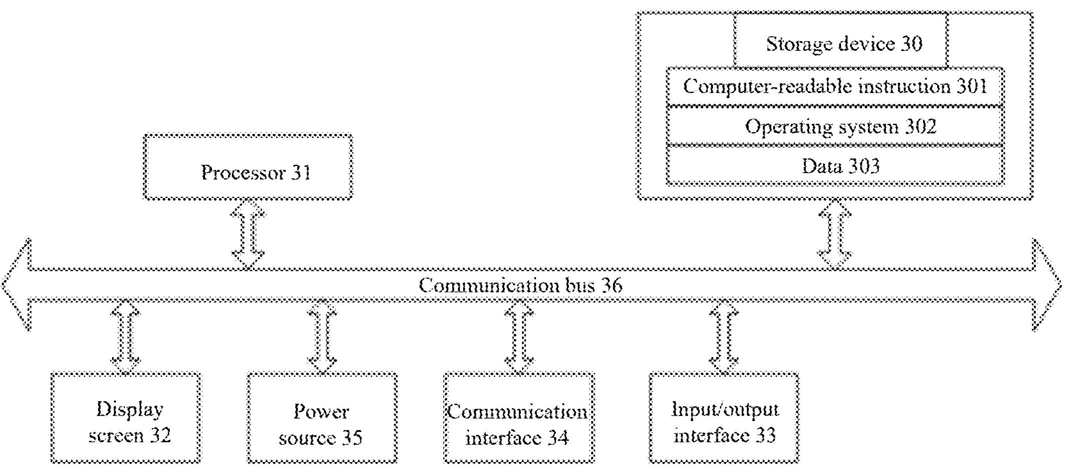
FIG. 3 is a schematic structural diagram of an electronic device provided by some embodiments of the present application.

FIG. 3 is a structural diagram of an electronic device provided by some embodiments of the present application. As shown in FIG. 3, the electronic device includes a storage device 30 and one or more processors 31. The storage device 30 is associated with the one or more processors 31 and is configured to store computer-readable instructions, which, when read and executed by the one or more processors 31, implement steps of: receiving state information of load units transmitted by a monitoring unit, and in response to determining that state information of a target load unit is abnormal, controlling a voltage division component connected to the target load unit to be conducted, and supplementing the power supply for the target load unit using the electrical double-layer capacitor.

The electronic device provided by the embodiments may include but not limited to a smartphone, a tablet computer, a laptop, or a desktop computer.

The processor 31 may include one or more processing cores, such as a Quad-core processor, eight-core processor, etc. The processor 31 may be implemented in at least one hardware form from a digital signal processing (DSP), a field-programmable gate array (FPGA), and a programmable logic array (PLA). The processor 31 may also include a host processor and a coprocessor. The host processor is a processor configured to process data in an awake state, and also called central processing unit (CPU). The coprocessor is a low power processor configured to process data in a standby state. In some embodiments, the processor 31 may be integrated with a graphics processing unit (GPU), and the GPU is responsible for rendering and drawing of content to be displayed on a screen. In some embodiments, the processor 31 may also include an artificial intelligence (AI) processor, and the AI processor is configured to handle computational operations related to machine learning.

The storage device 30 may include one or more non-transient computer-readable storage media. The storage device 30 may also include a high-speed random access memory, and a nonvolatile storage device, such as one or more disk storage devices and flash storage devices. In the embodiment, the storage device 30 is at least configured to store the following computer-readable instructions 301, and after the computer-readable instructions are loaded and executed by the one or more processors 31, related steps of a power supply method disclosed by any one of the above-mentioned embodiments may be implemented. Moreover, resources stored by the storage device 30 may also include an operating system 302, data 303, etc., and a storage mode may be transient storage or permanent storage. The operating system 302 may include Windows, Unix, Linux, etc. The data 303 may include but not limited to the state information of the load units, etc.

In some embodiments, the electronic device may also include a display screen 32, an input-output interface 33, a communication interface 34, a power source 35, and a communication bus 36.

Those skilled in the art may understand that the structure shown in FIG. 3 is not intended to limit the electronic device, and the electronic device may include components more or fewer than those shown in the figure.

It may be understood that if the method executed by the processor in the above embodiments is implemented in a form of a software functional unit and sold or used as a standalone product, it may be stored in a non-transient computer-readable storage medium. Based on such understanding, the technical solution of the present application-in its essence, a portion contributing to the prior art, or the entirety/part of the technical solution-may be embodied in a form of a software product. This software product is stored in a storage medium and implements all or part of the steps of the method described in the embodiments of the present application. The above-mentioned storage medium includes a U disk, a mobile hard disk drive, a read-only memory (ROM), a random access memory (RAM), an electrically erasable programmable read-only memory, a register, a hard disk, a removable disk, a compact disc read-only memory (CD-ROM), a diskette, an optical disk, and other media capable of storing program codes.

Figure 4:
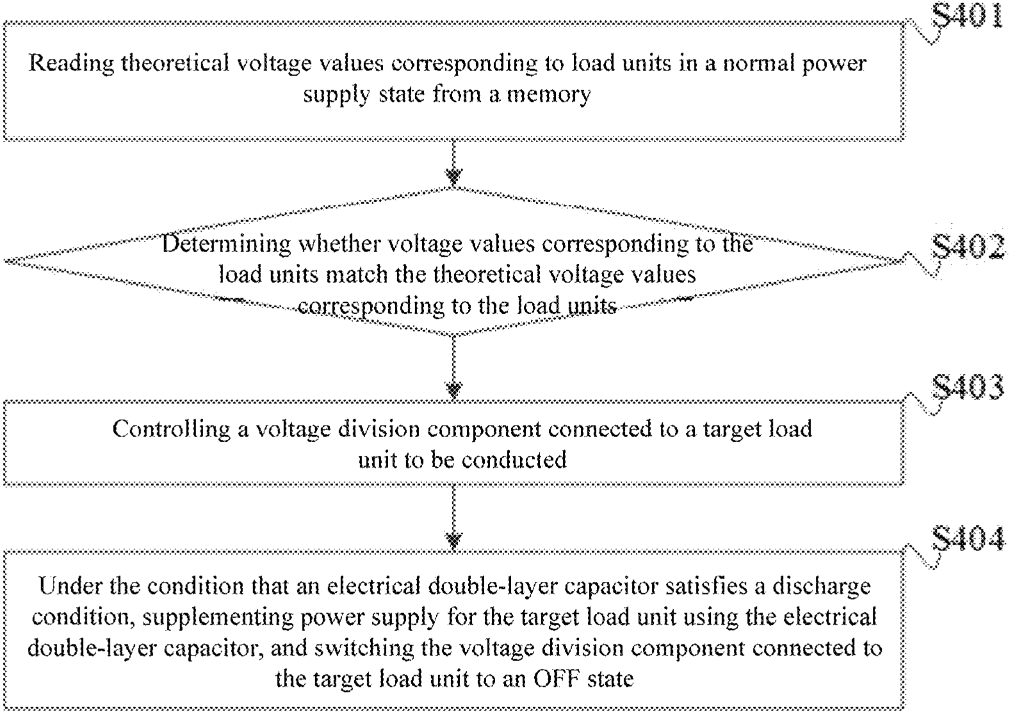
FIG. 4 is a flowchart of a method for supplementing power supply for a load unit with abnormal power supply provided by some embodiments of the present application.

FIG. 4 is a flow chart of a method for supplementing the power supply for a load unit with a power supply anomaly provided by some embodiments of the present application. The method includes:

S401: Read theoretical voltage values corresponding to a plurality of load units in a normal power supply state from a memory.

In practical application, voltage values of the plurality of load units in the normal power supply state may be recorded in the memory, and for easier distinction, the voltage values in the normal power supply state may be referred to as the theoretical voltage values.

S402: Determine whether the voltage values corresponding to the plurality of load units match the theoretical voltage values corresponding to the plurality of load units.

During implementation, a control unit may read the theoretical voltage values corresponding to the plurality of load units in the normal power supply state from the memory, determine whether the voltage values corresponding to the plurality of load units match the theoretical voltage values corresponding to the plurality of load units, and implement S403 in response to determining that a voltage value of a target load unit does not match its theoretical voltage value.

S403: Control a voltage division component connected to the target load unit to be conducted.

Under the condition that the voltage value of the target load unit does not match its theoretical voltage value, it indicates that a power supply anomaly of the target load unit occurs, and to ensure the stability of service on the target load unit, the control unit may control the voltage division component connected to the target load unit to be conducted; and at this moment, a preceding-level voltage converter of the target load unit is communicated with the target load unit through the voltage division component, to achieve short-time power supply for the target load unit.

S404: Under the condition that an electrical double-layer capacitor satisfies a discharge condition, supplement the power supply for the target load unit using the electrical double-layer capacitor, and switching the voltage division component connected to the target load unit to an OFF state.

To ensure that the preceding-level voltage converter is not overloaded due to power supplement, under the condition that the electrical double-layer capacitor satisfies the discharge condition, power may be supplemented for the target load unit using the electrical double-layer capacitor in a voltage-compatible manner, and the voltage division component connected to the target load unit is switched to the OFF state.

For description of features in the embodiments corresponding to FIG. 4, refer to relevant description in the embodiments corresponding to FIG. 1, and it will not be detailed herein.

From the above technical solution, it may be seen that the theoretical voltage values corresponding to the plurality of load units in the normal power supply state are read from the memory. Whether the voltage values corresponding to the plurality of load units match the theoretical voltage values corresponding to the plurality of load units is determined. Under the condition that the voltage value of the target load unit does not match its theoretical voltage value, it indicates that the power supply anomaly of the target load unit occurs, and the control unit may control the voltage division component connected to the target load unit to be conducted, to supply power to the target load unit, thereby ensuring normal operation of service on the target load unit. Under the condition that the electrical double-layer capacitor satisfies the discharge condition, power is supplemented for the target load unit using the electrical double-layer capacitor, and the voltage division component connected to the target load unit is switched to the OFF state, thereby ensuring that the first power supply unit connected to the voltage division component is not overloaded due to power supplement.

The control unit receives the capacitance value of the electrical double-layer capacitor, the power supplementing voltage value of the electrical double-layer capacitor, and the load current voltage of the target load unit in response to determining that the voltage value of the target load unit does not match its theoretical voltage value, determines the power supplement time according to the capacitance value of the electrical double-layer capacitor, the power supplementing voltage value of the electrical double-layer capacitor, and the load current voltage of the target load unit, restores the target load unit in response to determining that the power supplement time is greater than power supply anomaly restoration time, or backs up the target load unit in response to determining that the power supplement time is less than or equal to the power supply anomaly restoration time.

In practical application, the capacitance value of the electrical double-layer capacitor may be multiplied with the power supplementing voltage value of the electrical double-layer capacitor, and a product value is divided by the load current value of the target load unit, to obtain the power supplement time.

A restoration process for the target load unit may include receiving potential values, transmitted by the monitoring unit, of pins of the target load unit; reading theoretical potential values of the pins of the target load unit in a normal power supply state from the memory; and adjusting a target potential value of a target pin to a target theoretical potential value when the target potential value of the target pin is inconsistent with the target theoretical potential value of the target pin.

A backup process for the target load unit may include migrating service data of the target load unit to a corresponding load unit on a peer control device.

Figure 5:
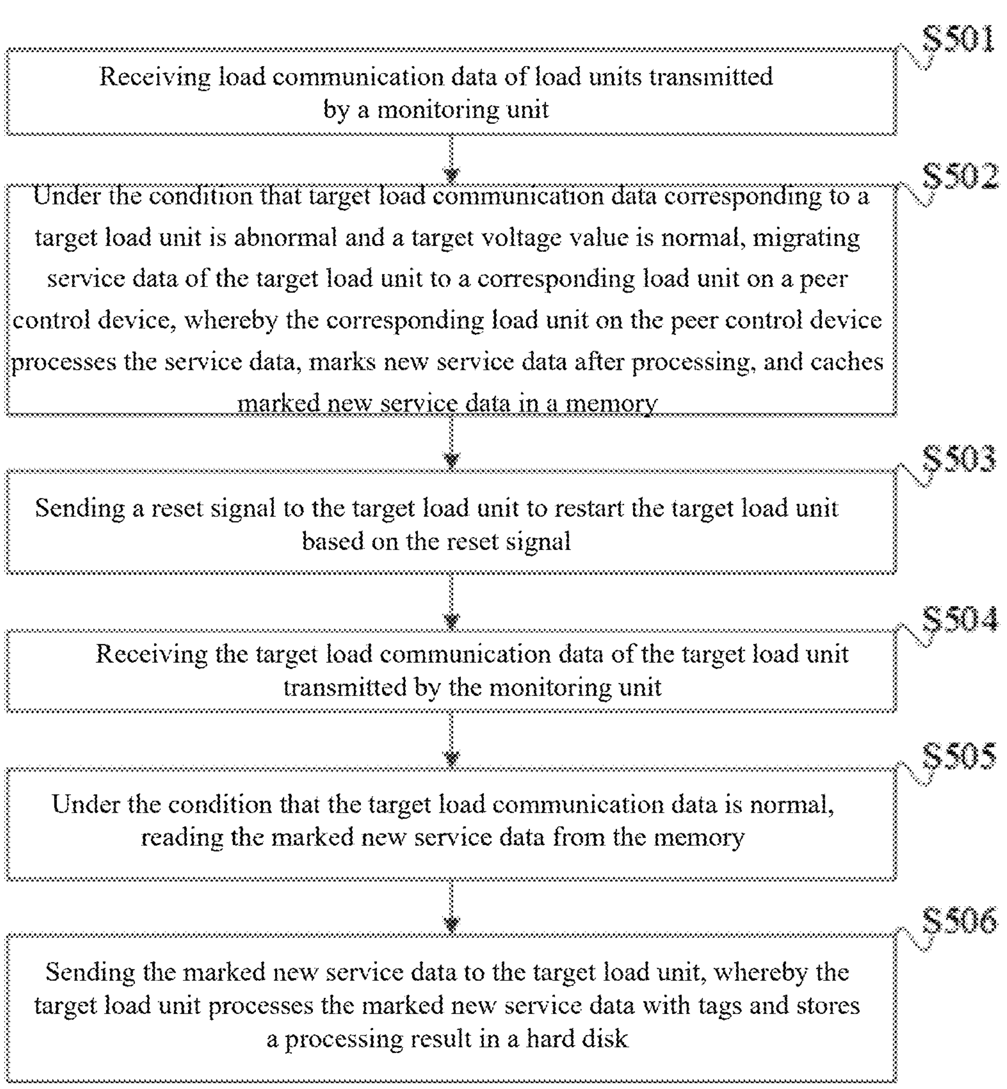
FIG. 5 is a flowchart of a method for restoring a high-speed link load communication anomaly provided by some embodiments of the present application.

FIG. 5 is a flow chart of a method for restoring a high-speed link load communication anomaly provided by some embodiments of the present application. The method includes:

S501: Receive load communication data of a plurality of load units transmitted by a monitoring unit.

Beside power supply anomalies, in practical application, a load unit in a normal power supply state may have a high-speed link load communication anomaly; and in the embodiments of the present application, the monitoring unit may acquire the load communication data of the plurality of load units, and transmit the load communication data to the control unit.

S502: Under the condition that target load communication data corresponding to a target load unit is abnormal and a target voltage value is normal, migrate service data of the target load unit to a corresponding load unit on a peer control device, whereby the corresponding load unit on the peer control device processes the service data, marks new service data after processing, and caches marked new service data in a memory.

Under the condition that the target load communication data corresponding to the target load unit is abnormal and the target voltage value is normal, it indicates that the target load unit currently has a high-speed link load communication anomaly, but has not yet encountered operational stoppages, card dropouts, or data loss, and to prevent system downtime caused by operational stoppages, card dropouts, or data loss of the target load unit, the service data on the abnormal target load unit may be backed up in advance.

In practical application, the service data of the target load unit may be migrated to the corresponding load unit on the peer control device; and after receiving the service data, the corresponding load unit on the peer control device may process the service data, mark the new service data after processing, and cache the marked new service data in the memory.

S503: Send a reset signal to the target load unit to restart the target load unit based on the reset signal.

The control unit may send the reset signal to the target load unit to restart the target load unit based on the reset signal;

S504: Receive the load communication data of the target load unit transmitted by the monitoring unit.

The monitoring unit may monitor the target load communication data of the target load unit, and transmit the target load communication data to the control unit;

S505: Under the condition that the target load communication data is normal, read marked new service data from the memory.

The control unit may determine whether the target load communication data is restored after receiving the target load communication data; and the normal target load communication data indicates that the target load unit may undertake service data processing again, and at this moment, the control unit may read the marked new service data from the memory.

S506: Send the marked new service data to the target load unit, whereby the target load unit processes the marked new service data, and stores a processing result in a hard disk.

The control unit sends the marked new service data to the target load unit; and the target load unit may, after receiving the marked new service data, process the marked new service data and store the processing result in the hard disk.

For description of features in the embodiments corresponding to FIG. 5, refer to relevant description in the embodiments corresponding to FIG. 1, and it will not be detailed herein.

From the above technical solution, it may be seen that the load communication data of the load units transmitted by the monitoring unit is received. Under the condition that the target load communication data corresponding to the target load unit is abnormal and the target voltage value is normal, the service data of the target load unit is migrated to the corresponding load unit on the peer control device, whereby the corresponding load unit on the peer control device processes the service data, marks the new service data after processing, and caches the new service data in the memory. The reset signal is sent to the target load unit to restart the target load unit based on the reset signal. The load communication data of the target load unit transmitted by the monitoring unit is received. Under the condition that the target load communication data is normal, the marked new service data is read from the memory. The marked new service data is sent to the target load unit, whereby the target load unit processes the marked new service data, and stores the processing result in the hard disk. The present application has the following beneficial effects: by monitoring changes of the load communication data, the high-speed link load communication anomaly may be found timely, and to avoid downtime due to card dropouts or data loss, data backup operation may be performed in advance, thereby achieving uninterrupted restoration in case of the high-speed link load communication anomaly. The control unit actively sends the reset signal to the load unit with the high-speed link load communication anomaly to restart the load unit, a high-speed link communication state of the restarted load unit is restored, and after the current restoration is determined to be completed, the restored load unit may execute a previous service data processing process again. In the whole process, the service data processing is not interrupted, restoration is performed before the load unit encounters the card dropouts and may not work, and system downtime is avoided.

The present application provides a hardware structure of the power supply system, and it is matched with a load unit power supply anomaly diagnosis and self-recovery algorithm, to achieve short-time power backup after the load unit abnormally loses power, without increase of additional costs. During short-time power backup, operations such as power supply restoration or data backup of the load units may be achieved, and the power supply system is ensured to provide an optimal solution within a short time, thereby increasing the reliability of a storage system. The solution for restoring the high-speed link load communication anomaly, provided by the present application, ensures restoration of a load link anomaly on the premise of ensuring normal operation of service, data loss or service interruption is not caused during anomaly restoration, and the operating reliability of the power supply system is enhanced.

The power supply system and the electronic device provided by the embodiments of the present application are configured to uniformly store anomaly restoration of array load units, also applied to devices with high-speed link loads, and applied in service scenarios such as servers and military computers.

The power supply system and the electronic device provided by the embodiments of the present application are introduced in detail as above. Each embodiments in the specification is described in a progressive mode, and focuses on the differences from other embodiments, and the identical or similar sections between the embodiments may be mutually referenced. The electronic device disclosed by the embodiments corresponds to the system disclosed by the embodiment, so the description is simple, and for relevant information, please refer to the respective system sections.

Professional personnel may also further realize that units and algorithm steps of the examples described with reference to the embodiments disclosed herein may be implemented by electronic hardware, computer software, or a combination of both, and to clearly describe the interchangeability of hardware and software, the components and steps of the examples have been generally described according to functions in the above description. The choice of whether these functions are ultimately implemented by hardware or software depends on the application and design constraints of the technical solutions. Professional technical personnel may use different methods to implement the described functions for each application, but such implementations should not be considered beyond the scope of the present application.

The power supply system and the electronic device provided by the present application are introduced in detail as above. The principle and implementations of the present application are elaborated with embodiments herein, and the descriptions made to the above embodiments are only adopted to help the solution of the present application and the core concept thereof to be understood. It should be noted that those of ordinary skill in the art may further make several improvements and modifications without departing from the principle of the present application. These improvements and modifications also fall within the protection scope of the present application.

The invention claimed is:

1. A power supply system, characterized by comprising a monitoring unit, a control unit, an electrical double-layer capacitor, a first power supply unit, and a second power supply unit, wherein the first power supply unit comprises:

a plurality of voltage conversion chips, each voltage conversion chip being communicated with a corresponding load unit;

the second power supply unit comprises:

a plurality of voltage division components, each voltage conversion chip being connected to a corresponding next-level load unit through one voltage division component;

the monitoring unit is connected to the load units, and the monitoring unit is configured to:

acquire state information of each load unit and transmit each state information to the control unit; and the control unit is separately connected to the electrical double-layer capacitor, the first power supply unit, and the second power supply unit, and the control unit is configured to:

receive each state information transmitted by the monitoring unit; and under a condition that state information of a target load unit is abnormal, control a voltage division component connected to the target load unit to be conducted, and supplement power supply for the target load unit using the electrical double-layer capacitor.

2. The power supply system according to claim 1, wherein the monitoring unit is configured to:

acquire voltage values of the load units; and transmit the voltage values to the control unit; and the control unit is configured to:

receive the voltage values transmitted by the monitoring unit; and under a condition that a target voltage value corresponding to the target load unit is abnormal, control the voltage division component connected to the target load unit to be conducted, and supplement the power supply for the target load unit using the electrical double-layer capacitor.

3. The power supply system according to claim 2, wherein the control unit is configured to:

read theoretical voltage values corresponding to the load units in a normal power supply state from a memory;

determine whether the voltage values corresponding to the load units match the theoretical voltage values corresponding to the load units;

under a condition that a voltage value of the target load unit does not match a theoretical voltage value of the target load unit, control the voltage division component connected to the target load unit to be conducted; and under a condition that the electrical double-layer capacitor satisfies a discharge condition, supplement the power supply for the target load unit using the electrical double-layer capacitor, and switch the voltage division component connected to the target load unit to an OFF state.

4. The power supply system according to claim 3, wherein the monitoring unit is configured to:

under a condition that the voltage value of the target load unit does not match the theoretical voltage value of the target load unit, transmit a capacitance value of the electrical double-layer capacitor, a power supplementing voltage value of the electrical double-layer capacitor, and a load current value of the target load unit, which are read, to the control unit; and the control unit is configured to:

determine power supplement time according to the capacitance value of the electrical double-layer capacitor, the power supplementing voltage value of the electrical double-layer capacitor, and the load current value of the target load unit;

restore the target load unit under a condition that the power supplement time is greater than power supply anomaly restoration time; and back up the target load unit under a condition that the power supplement time is less than or equal to the power supply anomaly restoration time.

5. The power supply system according to claim 4, wherein the monitoring unit is configured to:

transmit read potential values of pins of the target load unit to the control unit under a condition that the power supplement time is greater than the power supply anomaly restoration time; and the control unit is configured to:

receive the read potential values of the pins of the target load unit;

read theoretical potential values of the pins of the target load unit in the normal power supply state from the memory; and adjust a target potential value of a target pin to a target theoretical potential value under a condition that the target potential value of the target pin is inconsistent with the target theoretical potential value of the target pin.

6. The power supply system according to claim 4, wherein the control unit is configured to:

migrate service data of the target load unit to a corresponding load unit on a peer control device under a condition that the power supplement time is less than or equal to the power supply anomaly restoration time.

7. The power supply system according to claim 4, wherein the control unit is configured to:

calculate the power supplement time, the power supplement time being obtained by multiplying the capacitance value of the electrical double-layer capacitor with the power supplementing voltage value of the electrical double-layer capacitor to obtain a product value, and dividing the product value by the load current value of the target load unit.

8. The power supply system according to claim 3, further comprising a baseboard management controller, the monitoring unit being connected to the baseboard management controller, the monitoring unit being configured to:

under a condition that the voltage value of the target load unit does not match the theoretical voltage value of the target load unit, transmit alarm information to the baseboard management controller, and trigger the baseboard management controller to record an abnormal log.

9. The power supply system according to claim 2, wherein the monitoring unit is configured to:

acquire load communication data of the load units; and transmit the load communication data to the control unit;

the control unit is configured to:

receive the load communication data; and under a condition that target load communication data corresponding to the target load unit is abnormal and the target voltage value is normal, migrate service data of the target load unit to a corresponding load unit on a peer control device; and the corresponding load unit on the peer control device is configured to:

receive the service data; and process the service data, mark new service data after processing, and cache marked new service data in a memory.

10. The power supply system according to claim 9, wherein the control unit is configured to:

send a reset signal to the target load unit to restart the target load unit based on the reset signal;

the monitoring unit is configured to:

transmit monitored target load communication data of the target load unit to the control unit;

the control unit is configured to:

receive the monitored target load communication data;

read the marked new service data from the memory under a condition that the monitored target load communication data is normal; and send the marked new service data to the target load unit; and the target load unit is configured to:

receive the marked new service data, process the marked new service data, and store a processing result in a hard disk.

11. The power supply system according to claim 9, wherein the monitoring unit is configured to:

acquire the voltage values of the load units through a plurality of sampling pins, and acquire the load communication data of the load units through a plurality of serial bus links.

12. The power supply system according to claim 11, wherein the monitoring unit is configured to:

store the voltage values and the load communication data of the load units in a nonvolatile memory, and update data recorded in the nonvolatile memory according to the voltage values and the load communication data of the load units which are read in real time.

13. The power supply system according to claim 12, wherein the monitoring unit is configured to:

detect an available storage space of the nonvolatile memory; and under a condition that the available storage space of the nonvolatile memory is less than a set threshold, delete the data recorded in the nonvolatile memory according to data storage time.

14. The power supply system according to claim 1, wherein each of the plurality of voltage division components comprises a switching component and a voltage division resistor; and supply voltages of the plurality of voltage conversion chips are divided in sequence according to power supply levels of the plurality of load units, and a supply voltage of each of the plurality of voltage conversion chips is equal to a load voltage of the corresponding load unit and higher than a load voltage of the corresponding next-level load unit.

15. The power supply system according to claim 14, wherein a first voltage conversion chip of the plurality of voltage conversion chips is communicated with a first load unit of the load units corresponding to the first voltage conversion chip, and the first voltage conversion chip is connected to a second load unit of the load units through a first switching component and a first voltage division resistor, wherein a supply voltage of the first voltage conversion chip is equal to a first load voltage of the first load unit and higher than a second load voltage of the second load unit;

a resistance value of the first voltage division resistor is set based on the supply voltage of the first voltage conversion chip, and the second load voltage and load current of the second load unit; and the first voltage conversion chip is any voltage conversion chip in the plurality of voltage conversion chips.

16. An electronic device, adopting a power supply system comprising a monitoring unit, a control unit, an electrical double-layer capacitor, a first power supply unit, and a second power supply unit, wherein the first power supply unit comprises:

a plurality of voltage conversion chips, each voltage conversion chip being communicated with a corresponding load unit;

the second power supply unit comprises:

a plurality of voltage division components, each voltage conversion chip being connected to a corresponding next-level load unit through one voltage division component;

the monitoring unit is connected to the load units, and the monitoring unit is configured to:

acquire state information of each load unit and transmit each state information to the control unit; and the control unit is separately connected to the electrical double-layer capacitor, the first power supply unit, and the second power supply unit, and the control unit is configured to:

receive each state information transmitted by the monitoring unit; and under a condition that state information of a target load unit is abnormal, control a voltage division component connected to the target load unit to be conducted, and supplement power supply for the target load unit using the electrical double-layer capacitor; and the electronic device comprises:

a storage device, configured to store computer programs;

a processor, configured to execute the computer programs to:

receive the state information of a plurality of the load units transmitted by the monitoring unit; and under a condition that the state information of the target load unit is abnormal, control the voltage division component connected to the target load unit to be conducted, and supplement the power supply for the target load unit using the electrical double-layer capacitor.

17. The electronic device according to claim 16, wherein the processor is configured to:

read theoretical voltage values corresponding to the load units in a normal power supply state from memory;

determine whether voltage values corresponding to the load units match the theoretical voltage values corresponding to the load units;

under a condition that a voltage value of the target load unit does not match a theoretical voltage value of the target load unit, control the voltage division component connected to the target load unit to be conducted; and under a condition that the electrical double-layer capacitor satisfies a discharge condition, supplement the power supply for the target load unit using the electrical double-layer capacitor, and switch the voltage division component connected to the target load unit to an OFF state.

18. The electronic device according to claim 17, wherein the processor is further configured to:

under a condition that the voltage value of the target load unit does not match the theoretical voltage value of the target load unit, receive a capacitance value of the electrical double-layer capacitor, a power supplementing voltage value of the electrical double-layer capacitor, and a load current value of the target load unit which are transmitted by the monitoring unit;

determine power supplement time according to the capacitance value of the electrical double-layer capacitor, the power supplementing voltage value of the electrical double-layer capacitor, and the load current value of the target load unit;

restore the target load unit under a condition that the power supplement time is greater than power supply anomaly restoration time; and back up the target load unit under a condition that the power supplement time is less than or equal to the power supply anomaly restoration time.

19. The electronic device according to claim 17, wherein the processor is further configured to:

receive load communication data of the load units transmitted by the monitoring unit; and under a condition that target load communication data corresponding to the target load unit is abnormal and a target voltage value is normal, migrate service data of the target load unit to a corresponding load unit on a peer control device, whereby the corresponding load unit on the peer control device processes the service data, marks new service data after processing, and caches marked new service data in memory.

20. The electronic device according to claim 19, wherein the processor is further configured to:

after that the service data of the target load unit is migrated to the corresponding load unit on the peer control device, send a reset signal to the target load unit to restart the target load unit based on the reset signal;

receive the target load communication data of the target load unit transmitted by the monitoring unit;

under a condition that the target load communication data is normal, read the marked new service data from the memory; and send the marked new service data to the target load unit, whereby the target load unit processes the marked new service data and stores a processing result in a hard disk.

* * * * *